United States Patent
Bozionek et al.

(10) Patent No.: US 10,455,383 B2
(45) Date of Patent: *Oct. 22, 2019

(54) METHOD AND UNIT USED TO DETERMINE USEABLE SERVICES

(71) Applicant: Unify GmbH & Co. KG, Munich (DE)

(72) Inventors: Bruno Bozionek, Borchen (DE); Dieter Hemkemeyer, Olde (DE); Karl Klaghofer, Munich (DE); Ralf Neuhaus, Lunen (DE); Michael Tietsch, Kaufering (DE); Rainer Uecker, Mulheim (DE); Rainer Zimmermann, Paderborn (DE)

(73) Assignee: Unify GmbH & Co. KG, Munich (DE)

( * ) Notice: Subject to any disclaimer, the term of this patent is extended or adjusted under 35 U.S.C. 154(b) by 126 days.

This patent is subject to a terminal disclaimer.

(21) Appl. No.: 15/241,313

(22) Filed: Aug. 19, 2016

(65) Prior Publication Data
US 2016/0360381 A1    Dec. 8, 2016

Related U.S. Application Data

(63) Continuation of application No. 11/587,202, filed as application No. PCT/EP2005/051071 on Mar. 10, 2005, now Pat. No. 9,467,562.

(30) Foreign Application Priority Data

Apr. 30, 2004  (DE) .......................... 10 2004 021 321

(51) Int. Cl.
*H04M 3/42*   (2006.01)
*H04W 4/33*   (2018.01)
(Continued)

(52) U.S. Cl.
CPC ........... *H04W 4/33* (2018.02); *H04L 65/4084* (2013.01); *H04M 3/42229* (2013.01);
(Continued)

(58) Field of Classification Search
CPC ....... G06F 9/547; H04L 29/06; H04L 67/303; H04L 67/18; H04L 67/40; H04L 67/306;
(Continued)

(56) References Cited

U.S. PATENT DOCUMENTS

| 5,812,865 A | * | 9/1998 | Theimer | ................ G06F 9/547 |
| | | | | 379/88.13 |
| 6,665,611 B1 | * | 12/2003 | Oran | ..................... G01S 5/0027 |
| | | | | 455/404.2 |

(Continued)

FOREIGN PATENT DOCUMENTS

| DE | 69322323 T2 | 4/1999 |
| DE | 69909555 T2 | 5/2004 |

(Continued)

*Primary Examiner* — Aftab N. Khan
(74) *Attorney, Agent, or Firm* — Buchanan Ingersoll & Rooney PC

(57) ABSTRACT

In one aspect, a method used to determine services in a network is provided. For a plurality of devices, information pertaining to a location of the respective device is stored in a location information item. A location information item providing a location of a user is generated. At least one of the plurality of devices to be used by the user based on the generated location information item and to the stored location information items is automatically selecting; a status report is transmitted to a device used by the user, with the user being offered the use a service via the status report, the offered service effected by the selected device.

20 Claims, 2 Drawing Sheets

(51) Int. Cl.

| | |
|---|---|
| *H04W 64/00* | (2009.01) |
| *H04W 4/029* | (2018.01) |
| *H04L 29/06* | (2006.01) |
| *H04W 4/02* | (2018.01) |
| *H04W 4/04* | (2009.01) |
| *H04W 76/10* | (2018.01) |
| *H04L 29/08* | (2006.01) |

(52) U.S. Cl.
CPC .......... *H04W 4/023* (2013.01); *H04W 4/029* (2018.02); *H04W 4/043* (2013.01); *H04W 64/00* (2013.01); *H04W 76/10* (2018.02); *H04L 29/08657* (2013.01); *H04L 67/18* (2013.01); *H04M 3/42348* (2013.01); *H04M 2242/14* (2013.01)

(58) Field of Classification Search
CPC ... H04L 69/329; H04L 69/24; H04M 3/42348
USPC ........ 455/404.2, 414.1, 414.2; 709/217, 219, 709/227; 379/88.13, 202.01, 215.01
See application file for complete search history.

(56) References Cited

U.S. PATENT DOCUMENTS

| | | | |
|---|---|---|---|
| 6,857,021 B1 * | 2/2005 | Schuster | G06F 1/1632 709/217 |
| 7,006,618 B1 | 2/2006 | Shaffer et al. | |
| 7,236,580 B1 * | 6/2007 | Sarkar | H04M 3/42221 379/202.01 |
| 7,853,693 B2 * | 12/2010 | Abraham | H04L 67/18 345/639 |
| 2002/0029277 A1 * | 3/2002 | Simpson-Young | H04L 12/2805 709/228 |
| 2002/0174199 A1 * | 11/2002 | Horvitz | G06Q 10/107 709/220 |
| 2003/0217122 A1 | 11/2003 | Roese et al. | |
| 2004/0203922 A1 * | 10/2004 | Hines | H04W 4/02 455/456.1 |
| 2004/0223003 A1 * | 11/2004 | Heirich | G06T 15/005 345/629 |
| 2004/0267934 A1 * | 12/2004 | Patiejunas | G06F 9/546 709/227 |
| 2005/0003834 A1 * | 1/2005 | Hughes | H04W 4/02 455/456.1 |
| 2005/0020206 A1 * | 1/2005 | Leeper | H04B 1/7172 455/41.2 |
| 2005/0117910 A1 * | 6/2005 | Foote | H04B 10/1143 398/106 |
| 2005/0135305 A1 | 6/2005 | Wentink | |

FOREIGN PATENT DOCUMENTS

| | | |
|---|---|---|
| EP | 0138108 A2 | 4/1985 |
| EP | 1328108 A1 | 7/2003 |
| EP | 1370102 A1 | 12/2003 |
| WO | 00/39987 A1 | 7/2000 |
| WO | 01/65821 A2 | 9/2001 |

* cited by examiner

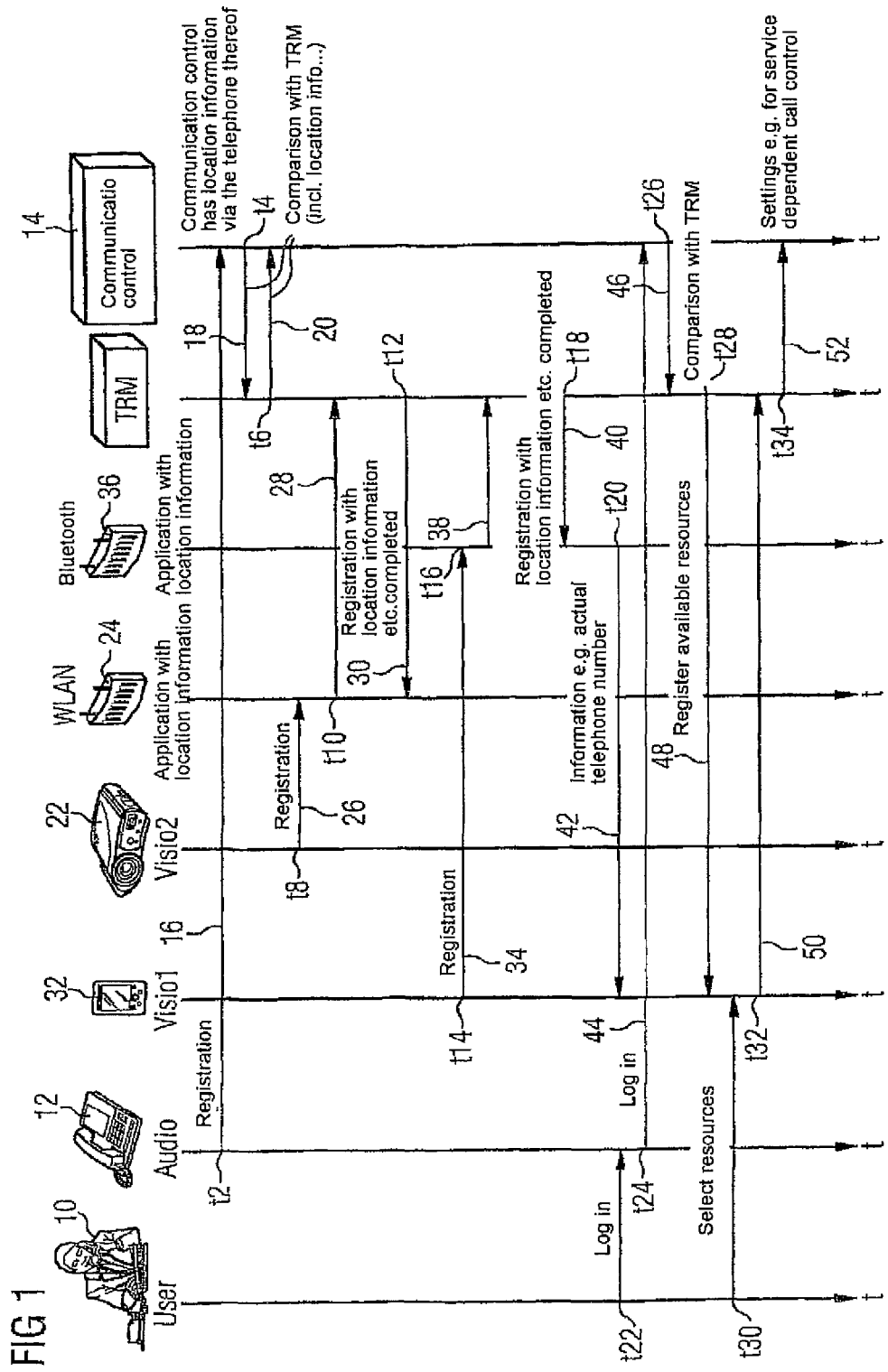

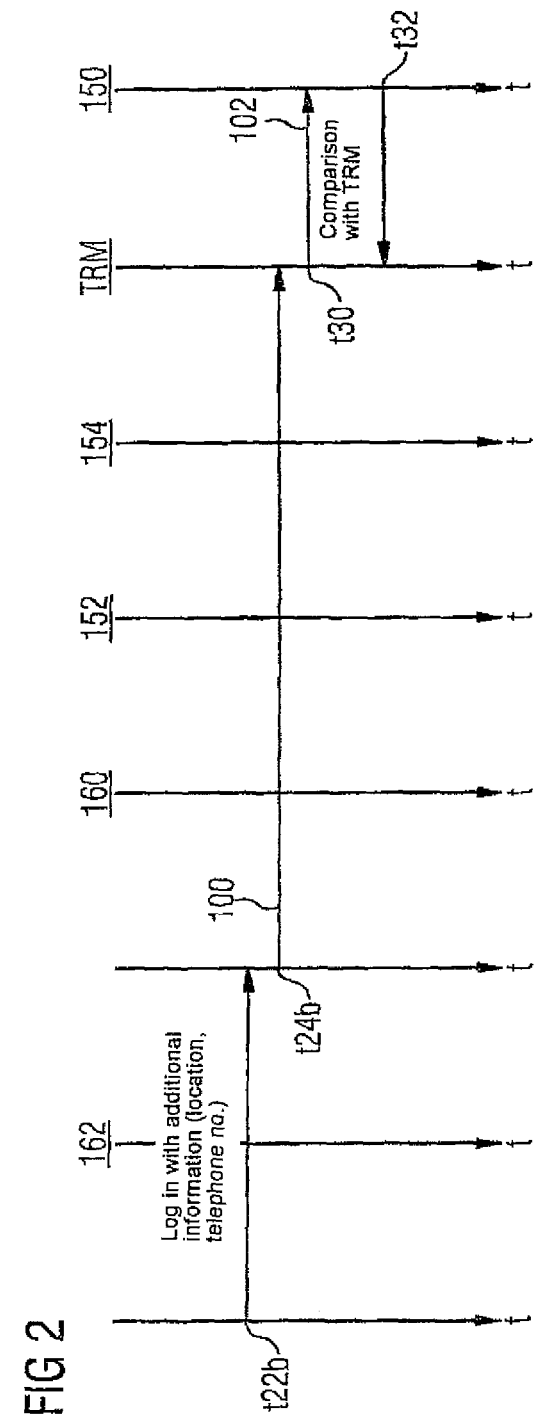

METHOD AND UNIT USED TO DETERMINE USEABLE SERVICES

CROSS-REFERENCE TO RELATED APPLICATIONS

This application is a continuation of U.S. patent application Ser. No. 11/587,202, which is the US National Stage of International Application No. PCT/EP2005/051071, filed Mar. 10, 2005 and claims the benefit therefore. The International Application claims the benefit of German Application No. 102004021321.6 filed Apr. 30, 2004, both of the applications are incorporated by reference herein in their entirety.

FIELD OF INVENTION

The invention relates inter alia to a method, in which location information is stored for several devices, with each item of location information containing details about the installation location of the respective device.

BACKGROUND OF INVENTION

For example, the devices are telephones connected to a privately used telecommunications system. For service purposes, when telephones log in to the telecommunications system, buildings and room numbers are also noted, which makes it easier for the service employees to allocate telephone numbers and rooms to each other.

However, location information can also be stored for other devices in a local data transmission network for example, the location of data processing equipment, printers, scanners or of other devices.

SUMMARY OF INVENTION

An object of the invention is to specify a simple method with which new applications are developed based on location data, in particular the determining of services useable for a user. In addition a unit used to determine useable services is to be specified.

The invention is based on the consideration that location data can be used by devices to automatically offer a user the use of services that are provided by these devices when the whereabouts of the user is known. The inventive method includes the following:

generation of an item of location information that specifies the whereabouts of a user, according to the item of location information determined and to the location data stored, automatic selection of at least one device that the user can and is permitted to use, transmission of a status report to a device or to a reference device used by the user, with the user being offered the use of at least one service by means of the status report, said service being effected by a device or by a device composed of several devices.

These measures allow the user not to have to concern himself about what devices are arranged in his environment and which devices are possibly idle. Furthermore, the user can be relieved from having to make any necessary driver or protocol translations as this is automatically provided as a precaution or when the respective service is selected by the user. Nor does the user have to search through his environment to obtain an overview of the useable devices. Thus it is not possible to overlook devices, for example in the corner of a room.

Through the formation of combined devices, the user is also offered services that extend the service offer beyond that of the services that can be provided by the individual devices on their own, again the user is relieved from having to look for device combination possibilities himself and possibly having to procure the necessary driver or protocol translation programs.

In one development, devices are automatically selected on the basis of room limits or of room numbers in a building. If the determined item of location information or a stored item of location information is not available as a room number then it is converted into a room number. Thus coordinates are converted into room numbers using a building plan.

In another development, selection is made according to location information that contains coordinate data. For example, using a global positioning system, e.g. GPS (Global Positioning System) the device locations of a large number of devices can be easily determined. It is also possible to convert room data into coordinate data using building plans. In the selection of the devices, an item of information on the vicinity is also preset, for example, with a value of 5 m or of 10 m. This offers the advantage that also devices that are arranged in a room neighboring the room in which the user is currently staying can be included.

The following are used as devices in further forms:
an image projector,
a monitor,
a image recording unit, in particular a camera,
a telephone, in particular a fixed line network telephone or a mobile radio telephone, and/or
a data processing unit, in particular a portable data processing unit, such as a notebook or a data processing unit that can he operated while held in the hand.

In a next development, devices are permanently assigned to the user, which devices, independently of the item of location information generated, are to be included in the status report and are included. In this way the user is given the possibility of linking service links of the services, determined according to location data to the permanently assigned devices, for example, a call diversion from a permanently assigned device to a device set up in its momentary environment.

In another development, a service offered relates to a multimedia communication that is implemented using a composed device. A collective identifier is assigned to the composed device under which collective identifier it can be reached or which collective identifier can be specified as send data when the composed device is dialed from other devices. In a development, the collective identifier is a device identifier, which is also assigned to one of the devices of the composed device, in particular to a communication device that has a telephone number or an Internet address.

In a next development, as part of a connection that is set up using a collective device identifier or where the collective device identifier is specified as the sender, at least two different kinds of user data are received and automatically forwarded to at least two devices of the composed device according to the type of the user data. Alternatively or cumulatively user data streams coming from at least two devices are automatically forwarded to one remote station.

The device, whose device identifier is used as a collective device identifier, is also called a master device. In one embodiment the connection setup to and the connection cleardown from the other devices is carried out automatically as a function of the inputs to the master device.

In a next development, while a service offered is being used, at least one item of location information is updated, in particular the item of location information concerning the whereabouts of the user or of an item of location information of a device involved in providing a service being used at present by the user. A change of status message is generated as a function of the changed item of location information, in which change of status message a different device is assigned to the currently used service or in which message the possibility of a device being differently assigned to a currently used service is noted or in which message a currently used service is noted as no longer available. The user manually opts for the other device. In an alternative development, a switch is automatically made to another device. This function is used in particular in the case of a change of rooms.

The invention relates, moreover, to a unit used to determine useable services. The unit is suitable in particular for carrying out the inventive method so that the above mentioned technical effects apply.

The invention also relates to a control unit with a distribution unit, which, in the event of an incoming communication request message, acts as a device for the services given in the communication request message towards a communication partner device and distributes the at least two incoming media streams between at least two different devices. Alternatively or cumulatively, the control unit contains a bundling unit, which, in the event of outgoing communication request messages, combines media streams from at least two individual devices and which acts as a device with different services towards a communication partner device. Thus the above mentioned technical effects for a composed terminal apply for the control unit.

BRIEF DESCRIPTION OF THE DRAWINGS

Exemplary embodiments of the invention are explained below using the attached drawings, in which;

FIG. 1 shows a method for determining the useable services for a user whose whereabouts are determined automatically, and FIG. 2 a modification of the method according to FIG. 1, wherein the whereabouts of the user are input by the user.

DETAILED DESCRIPTION OF INVENTION

FIG. 1 shows a method for determining the services that can be used by a user 10, the whereabouts of the user 10 being determined indirectly via the location of a telephone 12, on which the user 10 is logging in.

Before the logging in, however, a series of preparatory actions are carried out. At a point in time t2, the telephone 12 is plugged into a telecommunications system 14, for example to a telecommunications system of Siemens Hicom or HiPath. Alternatively a telecommunications system with comparable services from a different manufacturer is used. The telephone 12 generates a registration message 16 directly after being plugged, at the point in time t2. In the telecommunications system 14 the room in which the telephone 12 is located is automatically or manually noted.

At a point in time t4, the telecommunications system 14 sends a comparison message 18 to a control unit TRM, in which comparison message the added telephone 12 is noted with the services it supports (e.g. Audio+SMS) and the room in Which the telephone is located. At a point in time t6, the control unit TRM sends a confirmation message 20 to the telecommunications system 14.

At a point in time t8, subsequent to the point in time t2, an image projector 22, which is also called a beamer, is installed in the same room in Which the telephone 12 is installed. The image projector 22 is operated via a radio interface to a data packet transmission network. The radio transmission link ends at an access unit 24, which is also called an access point and is located in the same room as the telephone 12. By way of example, the data packet transmission network is a so-called WLAN (Wireless Local Area Network). At the point in time t8, the image projector 22 is put into operation for the first time, whereupon a registration message 26 is automatically sent from the image projector 22 to the access unit 24. During the processing of the registration message 26, at a point in time t10 the access unit 24 sends a registration message 28 to the control unit TRM. The registration message 28 contains information regarding the device type of the projector 22 and the room number of the room in which the image projector 22 is standing.

During the processing of the registration message 28 in the control unit TRM, a device list is updated, which specifies the devices, the services and associated room numbers. At a point in time t12, the control unit TRM confirms the registration message 28 with a confirmation message 30.

Before the user 10 logs in, but after the user 10 enters the room in which the telephone 12 is set up, a mobile computer 32, which the user 10 carries around with him, sends, automatically or at the instigation of the users 10, a registration message 34 e.g. via a Bluetooth interface to an access unit 36, which is located in the same room as the telephone 12.

The device type of the mobile computer 32 and as the case may be also information about its user are given in the registration message 34. At a point in time t16, based on the registration message 34 in the access unit 36 or in a control unit of a data packet transmission network connected to the access unit 36 a registration message 38 is generated and sent to the control unit TRM. The registration message 38 contains the device type of the mobile computer 32 and the room number of the room in which the access unit 36 is set up. The registration message 38 is confirmed by the control unit TRM with a confirmation message 40 at a point in time t18. Based on the confirmation message 40, the access unit 36 or a control unit in the data packet transmission network, in which the access unit 36 is operated, generates an information message 42, which is sent to the computer 32. The information message 42 contains, for example, a confirmation of the log in and an actual telephone number, e.g. that of the telephone 12.

A master device for a composed terminal must be addressable per telephone number and can be identical to the operator device or reference device, but does not have to be, as shown (master device=telephone, operator device=PDA). The operator device is the device via which the control unit TRM communicates with the user 10.

In principle there are, for example, three paths possible:
1. The master device and the operator device are identical (e.g. PDA with GSM, such as the "Nokia Communicator"): In this case, the user 10 as it were takes his telephone number along with him. Telephone number. The telephone number in the information message 42 is that of the mobile master device.
2. The operator device itself (here PDA) cannot be reached under any telephone number. Here an adequate device is then elected master device; in the example this is telephone 12. The telephone number in the information message 42 is the telephone number of the telephone 12.

3. Several devices in a scenario can be reached via telephone numbers. One of these devices is elected master device, thereafter proceeding as in 2.

With that the preparations for the automatic determination of the services are concluded. At a point in time t22, the user 10 logs on the telephone 12, for example, by dialing a service number by inputting an identification and as the case may be also a password. At a point in time t24, a log-in message 44 is transmitted from the telephone 12 to the telecommunications system 14. Due to the confirmation message 20, the telecommunications system 14 has been switched in such a way that because of the log-in message 24, at a point in time t26 it notifies the control unit TRM of the log-in action of the user 10 by means of a notification message 46. Because of the notification message 46, at a point in time t28, with the help of a status report 48, the control unit TRM registers all the services and devices available to the user on the mobile computer 32. The status report 48 contains the following device groups:

devices set up in the room in which the user 10 is located, i.e. an item of information as to the telephone 12, to the image projector 22 and to the computer 32, as the case may be only those devices are shown that are actually switched on or that are activated for use by the user 10, devices that have been administratively permanently assigned to the user 10, for example, his private or business telephone, his private or business fax machine and his private or business e-mail address, optional, so-called composed devices, for example, if there is also a camera in his mobile computer 32, a videophone comprising the telephone 12 and the mobile computer 32, wherein the display unit of the computer 32 is also used as an image output unit.

At a point in time t30, the user 10 selects an offered service or links offered services. In the exemplary embodiment, the user 10 would like to divert calls from his business telephone to the telephone 12. After a corresponding input, at a point in time t32 the computer 32 generates a service use message 50, which is sent to the control unit TRM. At a point in time t34, the control unit TRM sends a settings message 52 to the communication control 14. If the business phone of the user 10 is also connected to the communications unit 14, then the telecommunications system 14 can take the necessary actions for the call diversion itself. In comparison, if the business telephone of the user 10 is located in a different telecommunications system, then the control unit TRM can take the necessary actions for the call diversion via a suitable interface to this telecommunications system (e.g. CTI).

In another exemplary embodiment, the user 10 does not log in to the telephone 12, but uses the mobile computer 32 to log in directly to the control unit TRM. In another alternative exemplary embodiment the location information is stored in a database to which the control unit TRM has access. Alternatively, the location information is retrieved from different databases through targeted queries, after the whereabouts of the user 10 is known, for example with a request for information to the telecommunications system 14, with which request all the telephones should be determined that are set up in the room in which the user 10 has just logged in.

FIG. 2 shows an exemplary embodiment in which the location information on the whereabouts of the user 10 is not determined automatically, because, for example, a public infrastructure is being used, e.g. the infrastructure of an hotel. In the embodiment via a WEB interface contact is made from the mobile computer 32 with the control unit TRM in order to register the necessary information. At a point in time t22b, the user 10 enters the required data into his mobile computer 32, in particular the item of location information as to his whereabouts and information as to a telephone number under which he can be reached.

At a point in time t24b, the mobile computer 32 sends a log-in message 100 via the Internet directly to the control unit TRM. The control unit TRM updates its location data and device data. For example, at a point in time t30, a comparison message 102 is sent to a communication control 150 of the hotel. At a point in time t32, the communication control 150 conveys to the control unit TRM location information on the useable devices and services that are set up in the same room of the hotel in which the user 10 is also located, for example, information on access units 152 and 154 and on devices 160 and 162 that the User 10 can use as a hotel guest, for example, a telephone or a fax machine. Moreover, similar processes are carried out in the hotel infrastructure, as explained above using FIG. 1.

In summary a realization is presented of a "composed multimedia communication terminal" (ZMK) that is composed of first communication devices that can be operated independently of each other under common coordination by a "Terminal Resources Management" (TRM), that is also called control unit TRM in short. The logical relationship e.g. between a telephone and a PDA (Personal Digital Assistant), i.e. a mobile computer 32, the graphic input and output potential of which is to be used additively to the telephone, is then produced administratively via the control unit TRM or ad hoc, the allocation of the control unit TRM being conveyed dynamically. It is this dynamic communication that makes it possible, if required, for example, to form a multimedia terminal from a mobile phone (audio) and a PDA (video) that is in the area of a WLAN—so-called hot spot—and/or data, and to use it in the same call, e.g. under an identical telephone number. From the communication partner's viewpoint, it is simply that an additional service, e.g. video, has become available, whereas, in fact an additional device, namely the PDA, has been added to the scenario, which device can physically even be assigned to a different network. In the example, the mobile phone is assigned to the GSM network (Global System Mobile), and the FDA or the mobile computer 32 assigned to the WLAN IP Network (Wireless Local Area Network/Internet Protocol).

In an exemplary embodiment, the display unit of the PDA is controlled via a video player program stored on the PDA, which program shows video data that is sent to the PDA. To record an image, a camera is used which is integrated in the PDA, which is attached to the PDA or which is located near the PDA. The video player program is addressed by the control unit TRM e.g. via an Internet address and a port number. The control unit TRM also conveys an Internet address and a port number to the camera to which Internet address and a port number the camera can send the image data. The control unit TRM emulates towards the other side, for example a H.323 terminal device or SIP terminal device (Session Initiation Protocol), wherein the actual data streams (audio, video etc.) do not necessarily have to pass the TRM. A media change (interworking) that may become necessary for the terminal device emulation is automatically arranged by the control unit TRM. The control unit TRM influences possibly the routings for these media but does not transport/modify said media itself.

With a composed device the control unit TRM acts, for example, on at least one communication control in the participating networks. The communication control can be executed centrally or locally. The control unit TRM acts on the communication control in such a way that:

in the case of incoming communication requests or connection demands, the different media streams are distributed between the different devices, so that this results in a logical or virtual device for all requested services, in the case of outgoing communication requests or connection demands, the individual devices or components of the composed multimedia terminal act towards the system as a whole like one multimedia terminal and appear to the system under a common telephone number/address with different services.

The control unit TRM manages the allocation between the telephone number/address and the services for each composed multimedia communication terminal and the devices responsible for the respective service and functioning as ZMK components or the addresses of said devices. Thereby the telephone number/address of a ZMK is identical to that of one of the assigned devices that is functioning as a master device. In another embodiment, however, a special telephone number/address is used and which is only issued for purposes of addressing the ZMK.

Depending on how the communication of individual devices to a ZMK should be made, the following possibilities arise:

static per administration, wherein no explicit support by the ZMK components is required, dynamic or ad hoc, wherein the ZMK components support log-in to and log-out from the ZMK and wherein information must be delivered, on the basis of which information a decision can be made as to which devices can be practically combined to the ZMK.

Via interfaces to the communication control, the TRM influences routing decision of the control in terms of the invention described here.

The following advantages are some of those that result:

the individual devices or the components of a ZMK do not require any additional interfaces to link directly to a device to be controlled. Only already existing physical interfaces are used, i.e. so-called "native interfaces".

the individual devices do not themselves have to assume any coordinating functions, so that neither is any device excluded from the method illustrated because of resource requirements needed for such functions and as the case may be resource requirements that are lacking.

connection demands can be evaluated early on with the help of the TRM and based on the evaluation result rejected or, if necessary, assigned separately according to media type to the different devices or different components of the ZMK.

the services can be used by the communication partners in the usual way, and do so without the necessity of taking into account physical features e.g. network interfaces or different telephone numbers/target addresses.

The devices and media mentioned are merely examples. Applications not explicitly mentioned such as e-mail etc. are integrated in a similar way in other embodiments.

When individual devices are composed to form a ZMK, criteria are used according to which at first independent devices are assigned to each other. According to the network infrastructure underlying the concrete implementation, one is possibly dealing with a pure device addressing, as in the telephone landline network today, which makes it necessary to assign to the user a master device, for example location dependent and temporarily, to which device the future addressing can be attached.

The following criteria, for example, are used:

1. spatial proximity of the devices to be linked, wherein one requires location data that gives the installation location of the devices involved and also the location of the user himself or of his master devices. For example, the user is in the radio range of the Bluetooth access point 36, which point has, for example, a range in the region of 3 to 10 meters. All the devices in this spatial sphere are offered for use to the user, wherein said devices—in as far as they are selected—would automatically be able to be detected by communication partners under the address of the users, at the present time typically under the user's telephone number, but in future systems under the user's name as well (generally called "Alias"). By way of example, an SMS (short message service) or an MMS (multimedia message service) is displayed on the image projector 22 when the telephone number of the telephone 12 is dialed. In addition, for example, optional rules on the permissibility of a link are brought in. It makes little sense, for example, to offer a mobile phone owner all the headsets of a conference room as possible input/output devices. In contrast it is a different matter in the case of a fax machine that is also in the conference room. In this case it can indeed be useful for the fax machine to be made available to several or all conference participants.

2. Logical allocation to the user or to the master device thereof, wherein, for example, the receipt of faxes on the fax machine in the office of the user also when the user is not present, is practical i.e. it is made as a permanent assignment. Details on such allocations are known to a person skilled in the art.

3. Combinations of 1. and 2. Due to certain events, e.g. of user reactions or of system events and rules, e.g. the logical allocations discussed in 2. are modified temporarily or permanently to the benefit of spatial factors (1.). To remain with the above example, faxes could thus be received temporarily in the conference room instead of in the local office.

The task of the Terminal Resources Management TRM or of the control unit TRM is to realize these links. Predefined rules and/or user inputs are consulted in the decision making. The necessary information for this with respect to presence and location derive from the user, from the devices themselves or their network interfaces or access points. The TRM collects this information and, as the case may be, informs the communication control or the relevant instance in the event of distributed controls via e.g. call diversions or said TRM sets up active links, for example, so-called third party calls, if the communication control does not support service-dependent routes.

The latter described interactions between TRM and the communication control require an interface between the two, which interface both provides the necessary information to the TRM and forwards corresponding commands to the communication control, which then carries them out. If the communication control is a private branch exchange, then CTI functions (Computer Telephony Integration) can be used. In connection with such functions reference is made to the standard CSTA I to III etc. (Computer Supported Telecommunication Application) of the ECMA (European Computer Manufacturer Association). In other communication controls use is made, for example, of functions similar to the CSTA functions.

As explained using FIG. 1, all participating users and devices can log-in or register at access points with location information. The allocation user 10 and mobile computer 32 can, for example, be preset administratively. The allocation of the user 10 to the telephone 12 occurs implicitly by logging in via the telephone 12.

As has been explained using FIG. 2, the methods can also be used even of certain location information is not determined automatically, e.g. in a public infrastructure in a hotel. Here, for example, contact with the TRM is made via, for example, a Web interface, in order to register the necessary information. Here also the allocation user 10 and mobile computer 32 is, by way of example, preset administratively. The allocation user 10 and telephone in the hotel can, for example, be made using the explicit information made when logging into the TRM user 10.

From the information gained, the TRM is able to work out the coordinating control commands to the communication control. According to the performance capability of this control, the TRM is, for example, also involved in the call handling so that the TRM can add functionalities that are missing in the communication control, for example, protocol translations or driver functions.

The opposite extreme is that the TRM accepts calls quasi acting as a substitute for the communication control in order to gain information from them, which it can then use to influence the communication control. This feature is also called "proxy" function.

The settings made by the TRM have the task such as, for example:
to deliver incoming calls or incoming data, according to their service, to the appropriate and assigned devices, and in the case of
outgoing calls or outgoing data, to insert address information using which information it is possible later to initiate a return call, for example.

Especially the latter is possibly also already supported by the devices themselves, which is why more intelligent devices already get the data necessary for that conveyed to them when they register, see, for example, the above explained differences in the registration of the mobile computer 32 and of the image projector 22.

In another embodiment, devices are determined based on the location data, which devices are then not included in the status report because their use is blocked for the user or because they are not ready for operation. Alternatively, such devices are included in the status report but are identified as blocked or otherwise not available.

What is claimed is:

1. A method used to provide services in a network, comprising:
    storing a plurality of first location information items for a plurality of devices, each of the first location information items identifying a location of a respective device of the plurality of devices;
    generating a second location information item that provides a location of a user;
    automatically selecting at least two of the plurality of devices to be used by the user based on the generated second location information item and the stored plurality of first location information items; and
    transmitting a status report offering services to be effected by the automatically selected devices to a device used by the user via the network such that the automatically selected devices define a composed device having a common address, each of the selected devices being an electronic device having a processor and non-transitory memory, the status report identifying the automatically selected devices; and
    controlling communication requests and connection demands for a communication connection associated with the user so that different media streams of the communication connection are distributed via the network to the automatically selected devices via the common address such that each of the automatically selected devices receives a different media stream during the communication connection.

2. The method of claim 1, wherein the location of the user is based on a location of a communication partner of the user.

3. The method of claim 1, wherein the generated second location information item denotes a room in a building; and
    wherein the selecting of at least two of the devices is also based on the room in the building.

4. The method of claim 1, comprising:
    determining a room in a building from the generated second location information item, and wherein the selecting of at least two of the devices is also based on the room in the building.

5. The method of claim 1, wherein the generated second location information item comprises a plurality of coordinate data for the location of the user, and the method also comprises:
    determining a room in which the user is located by converting the plurality of coordinate data into a room number using a building plan.

6. The method of claim 1, wherein the generated second location information item comprises a plurality of coordinate data and a vicinity value, the vicinity value specifying a first distance to a user device, and wherein the selected at least two devices are selected such that the selected devices are within the first distance to the user device.

7. The method of claim 1, wherein:
    the status report identifies the automatically selected devices such that a service use message is generatable by the user device based on the status report for utilization of services via the composed device; and
    the controlling of the communication requests and connection demands for the communication connection associated with the user occurs in response to receipt of the service use message from the user device.

8. The method of claim 1, wherein the selected devices are selected from the group consisting of a printer, an image projector, a monitor, an image recording unit, a telephone and a data processing unit.

9. The method of claim 1, wherein a device is permanently assigned to the user and the permanently assigned device is included in the status report.

10. The method of claim 1, wherein the offered services effected by the selected device relates to a multimedia communication using the composed device, the composed device comprised of the selected at least two devices, a collective device identifier is assigned to the composed device.

11. The method of claim 10, wherein a device identifier is assigned to at least one of the selected devices of the composed device.

12. The method as claimed in claim 1, further comprising:
    defining the composed device such that the composed device is comprised of the selected at least two devices;
    generating a connection demand containing a collective device identifier as an identifier of a calling terminal device or of a called terminal device such that user data is received and is automatically forwarded to the selected devices of the composed device according to a type of the user data during a connection set up in response to the connection demand.

13. The method as claimed in claim 1, further comprising:
generating a connection setup demand containing a collective device identifier of the composed device as an identifier of a calling terminal device or of a called terminal device; and
sending user data during a connection set up in response to the connection demand, the user data provided by the selected devices of the composed device.

14. The method of claim 13, comprising:
updating the generated second location information item or the stored first location information item of at least one of the plurality of devices and generating an amended status report according to the updated second location information item or the updated first location information item.

15. A device used to determine usable services for a user of a network, comprising:
a communication control comprising a processor and non-transitory memory, the communication control determining a first location information item that specifies a location of a user or a location of a communication partner of the user;
the communication control using at least one stored second location information item to automatically select a plurality of devices to be used by the user based on the determined first location information item and the at least one stored second location information item; and
the communication control generating a status report according to the selected devices, the status report offering a service useable via the selected devices so that different media streams of a communication connection are distributable to the automatically selected devices via a common address associated with the automatically selected devices such that each of the automatically selected devices receives a different media stream during the communication connection.

16. The device of claim 15, wherein each of the selected devices is selected from the group consisting of a printer, an image projector, a monitor, an image recording unit, a telephone and a data processing unit.

17. The device of claim 15, wherein the selected devices are selected to define a composed device; and
wherein the status report identifies the automatically selected devices such that a service use message is generatable by a user device to which the status report is sent based on the status report for use of the service via the composed device.

18. The device of claim 17, wherein the communication control defines a composed device that is comprised of the selected devices within the network.

19. The device of claim 18, wherein the communication control generates a collective identifier for the defined composed device, the collective identifier being the common address.

20. The device of claim 18, wherein the device has at least one interface for a network connection to at least some of the plurality of devices.

* * * * *